UNITED STATES PATENT OFFICE 2,011,095

PROCESS OF MATURING AND RIPENING MALT BEVERAGES

Leo Wallerstein, New York, N. Y.

No Drawing. Application May 2, 1933, Serial No. 668,986

8 Claims. (Cl. 195—2)

The present invention relates to the maturing and ripening of malt beverages and it particularly relates to the utilization of preparations of bio-catalyzers for the purpose of shortening the period required in the maturing and ripening of malt beverages, such as beer and ale.

Beer is produced from malt, usually barley malt, hops, water and yeast with or without the addition of other cereals. In the brewing process the malt is cleaned and crushed and then mashed with or without other cereals. The resultant solution containing the extractives is strained or filtered from the grains or insoluble portions of the mash.

This solution, termed the wort, is boiled with the addition of hops. Then the hopped wort is strained or filtered from the spent hops, the wort is cooled, and yeast is added to incite fermentation. The malt beverage after fermentation is drawn off and is stored for a considerable length of time in order that it may ripen and mature.

Such ripening and maturing is usually brought about by storing the beverages in large vats, known as storage vats, at low temperatures around 32 to 40° F. This time of aging varies, but for well-matured beverages, such as lager beers, it frequently requires from one to three months. During the storing and aging a number of changes take place. For instance the clarification, which results, may be readily followed by visual observation. Other changes cause improvement in the flavor, taste and general qualities. These changes are much more subtle and take place very slowly and gradually.

Up to the present time the mechanism of these changes has not been fully explained. The first mentioned changes, that is the clarification of the beverage, may be assisted by the addition of finings, such as gelatin, to the beverage or by filtration. The ripening and maturing, however, resulting in general improvement in flavor and taste, is not readily subject to acceleration.

This long continued ripening and maturing of malt beverages requires the utilization of a large amount of storage facilities, and considerably ties up the capital of the brewing establishment.

Moreover, when the beer is to be pasteurized and, for example, afterwards bottled, it has been found that the maturing and ripening must be accomplished before the pasteurization operation. The pasteurization operation apparently has the effect of stopping or preventing continuation of the normal maturing and ripening of beer, so that even though the beer be stored or kept in bottles for considerable periods of time after it has been pasteurized, no substantial maturing or ripening takes place.

An object of the present invention is to provide a product and process by which it will be possible to substantially accelerate the maturing and ripening of malt beverage, with resultant economy in the cost of manufacture and with improvement in the quality of the malt beverage produced.

Another object is to provide a process and product by which it will be possible to accomplish the maturing and ripening of beer even though it has been previously pasteurized and, for example, subsequently bottled.

It has been found that by the use of a preparation containing metabolic products produced by the cultivation of micro-organisms, it is possible to accelerate and hasten the maturing and ripening of malt beverage and to accomplish such maturing and ripening even after pasteurization.

Well suited for this purpose are preparations derived from the culture liquor resulting from the growth of bacteria belonging to the subtilis and mesentericus group. Bacillus mesentericus is a member of the Bacillus subtilis group and Bacilli subtilis and mesentericus are aerobic spore-forming non-pathogenic bacteria.

The accelerating preparations or bio-catalyzers may be prepared in various ways. One satisfactory method will be now disclosed as an example.

A malt wort of about 12% Balling is made by mashing barley malt with water. This malt wort is adjusted to a pH advantageous growth of the micro-organisms, for instance, to a pH of about 6 to 7.

The wort is then sterilized, for instance, by heating, under pressure, preferably to a temperature of about 120° C.

The sterilized wort is then cooled to 37 to 40° C. and inoculated with a culture of the micro-organism. The inoculated wort is forced into a culture apparatus which was previously sterilized under such conditions as to avoid contamination.

As the development of these bacteria and the production of the desired metabolic products takes place most readily when growing same in comparatively thin layers or strata it is advantageous to use a culture apparatus which is so constructed that the growing of these bacteria takes place in thin quiescent layers, for example, 1 to 3 inches in thickness, with exposure of as large a surface in proportion to the volume as possible.

As these bacteria are aerobic it is necessary that apparatus is equipped to provide for sufficient aeration.

In preparing the wort which is used as a culture medium, I have found that the addition of small amounts of autolzed yeast to the malt wort improves the growing of the bacteria, and also increases the yield in the desirable biocatalyzers. Malt wort of the above gravity generally contains from 0.5% to 0.7% of proteins and I have found that the addition of sufficient autolyzed yeast extract to the malt wort to raise the protein content to 1.2% to 1.5% will greatly facilitate the growing of the bacteria and increase the yields of the desired bio-catalyzers.

The growth in the culture apparatus is allowed to take place for about a week to ten days and at temperatures ranging from about 37 to 45° C. During this time the bacterial growth reaches its maximum and metabolic substances are formed which are secreted by the organisms and found in the bacterial liquor.

These metabolic products include degradation products of proteins and carbohydrates, proteases, amylases, and many other bio-chemical substances, the exact nature of which has not been determined.

After this growing period, the liquor is separated from the bacterial skin. For example, the bacterial skin may be removed by high speed centrifuges or by filtration. It must be done, however, under conditions to prevent infection. This is best accomplished either by operating at very low temperatures or preferably by the addition of suitable antiseptics, such as sulfites or alcohol, to the bacterial liquor.

The resulting liquor can be used as such for the purpose of accelerating the ripening and maturing of the beer. For this purpose, the addition of from 25 to 100 cubic centimeters of the bacterial metabolic liquor for each 31 gallon barrel of beer or ale will be sufficient to accelerate substantially the ripening and maturing of same.

A better method, however, is to concentrate the active principles contained in the bacterial liquor and to use for commercial purposes the concentrated preparation which will be found to be more stable and can readily be transported. In order to prepare such a concentrated product, the bio-catalyzers contained in the bacterial liquor are precipitated from this liquor by the addition of sufficient amount of alcohol or acetone. As a general rule from one to two volumes of these precipitating agents are sufficient for every volume of bacterial liquor to be precipitated.

A further method of concentrating consists in salting out the active principles by the addition to the bacterial liquor of about an equal volume of a saturated ammonium sulfate solution. In either case the precipitated material is separated by centrifuging or filtration and dried at a low temperature, preferably of about less than 40° C.

Only comparatively small amounts of these concentrated materials are necessary to accomplish the desired acceleration of the ripening and maturing of the malt beverage. For example, the addition of from 1 to 5 grams per 31 gallon barrel or per 117 liters of malt beverage has been found to give excellent results and greatly to hasten the maturing and ripening of the beverage. The addition of the bio-catalyzer either in the liquid form or in the active dry form may be made either during fermentation or shortly after the main fermentation has been finished.

It has also been found that the addition of these bio-products as described also brings about quicker clarification and according to tests, beers, ales, or other malt beverages so treated will mature in a shorter time than similar beers or ales to which these bio-catalyzers have not been added.

For example, as compared to the period of one to three months previously required for the ripening and maturing of malt beverages by the utilization of the bio-catalyzers of the present invention, it is possible to shorten the period of storage to as short a time as a week or ten days with the production of a beverage, beer or ale of the same or superior quality.

It has been found that the best results are obtained when the above described bio-catalyzers are added to the beer shortly before the fermentation is completed and when the beer still contains considerable amount of yeast.

It has been observed that upon the addition to beer when it still contains this yeast, the described action of the ripening and maturing of the beer is considerably accelerated.

While the mechanism of the action of these bio-catalyzers, as stated before, has not been established, it is probable that they have the power to act on the yeast cells and due to this action certain constituents contained in the yeast cells will diffuse from the yeast cells into the beer and thereby speed up the aging and maturing of the beer.

The addition of the bio-catalyzers, as described above, to the beer, ale, or other malt beverage, has been found to cause continued ripening and maturing even though the beer be pasteurized and thereafter stored, as for example in bottles. By adding bio-catalyzers to beer which is to be pasteurized, it is not necessary to store the beer or other malt beverage for long periods of time before pasteurization to achieve the desired maturity and ripening. Moreover, although beer, ale and other malt beverages frequently decrease in quality upon pasteurization, with the addition of bio-catalyzers, according to the present invention, such disadvantageous effect of pasteurization appears to be altogether avoided.

I claim:

1. The process of maturing and ripening an alcoholic fermented malt beverage which comprises adding to the beverage after the fermentation and before it has matured and ripened a part of the metabolic material produced by cultivation of *Bacillus subtilis,* said part containing that portion of the total metabolic material which is precipitable by salting out and by alcohol and then causing it to mature and ripen.

2. The process of maturing and ripening an alcoholic fermented malt beverage which comprises adding to the beverage after the fermentation and before it has matured and ripened a part of the metabolic material produced by cultivation of a Bacillus selected from the group consisting of *Bacillus subtilis* and *Bacillus mesentericus,* said part containing that portion of the total metabolic material which is precipitable by salting out and by alcohol and then causing it to mature and ripen.

3. The process of maturing and ripening an alcoholic fermented malt beverage which comprises adding to the beverage after the fermentation and before it has matured and ripened the precipitate prepared by the addition of alcohol to the metabolic material produced by cultivation of a Bacillus selected from the group consisting of *Bacillus subtilis* and *Bacillus mesentericus* and then causing it to mature and ripen, said maturing and ripening being accelerated by such addition to the beverage.

4. The process of maturing and ripening an alcoholic fermented malt beverage which comprises adding to the beverage after the fermentation and before it has matured and ripened the precipitate prepared by salting out material from the metabolic material produced by cultivation of a Bacillus selected from the group consisting of *Bacillus subtilis* and *Bacillus mesentericus* and then causing it to mature and ripen, said maturing and ripening being accelerated by such addition to the beverage.

5. The process of maturing and ripening an alcoholic fermented malt beverage which comprises adding to the beverage after the fermentation and before it has matured and ripened ½ to 10 grams, per 31 gallon barrel of the beverage, of a part of the metabolic material produced by cultivation of a Bacillus selected from the group consisting of *Bacillus subtilis* and *Bacillus mesentericus*, said part containing that portion of the total metabolic material which is precipitable by salting out and by alcohol and then causing it to mature and ripen, said maturing and ripening being accelerated by such addition to the beverage.

6. In the process of making a beverage which includes alcoholic fermentation of a boiled and cooled malt wort, adding a part of the products produced by cultivation of *Bacillus subtilis*, said part containing that portion of the total metabolic products which is precipitable by salting out and by alcohol, said addition to the material being effected before it has matured and ripened, and then causing ripening and maturing of the material after the alcoholic fermentation.

7. In the process of making a beverage which includes alcoholic fermentation of a boiled and cooled malt wort, adding a part of the products produced by cultivation of a Bacillus selected from the group consisting of *Bacillus subtilis* and *Bacillus mesentericus*, said part containing that portion of the total metabolic products which is precipitable by salting out and by alcohol, said addition to the material being effected before it has matured and ripened, and then causing ripening and maturing of the material after the alcoholic fermentation.

8. The process of maturing and ripening an alcoholic fermented malt beverage, which comprises adding to the beverage before it has matured and ripened a part of the metabolic material produced by cultivation of a Bacillus selected from the group consisting of *Bacillus subtilis* and *Bacillus mesentericus*, said metabolical part containing that portion of the total metabolic material which is precipitable by salting out and by alcohol and then causing it to mature and ripen.

LEO WALLERSTEIN.